US012761598B2

(12) United States Patent
Oh

(10) Patent No.: US 12,761,598 B2
(45) Date of Patent: Oct. 13, 2026

(54) WRAP JAM DETECTION FOR FUSER

(71) Applicant: Hewlett-Packard Development Company, L.P., Spring, TX (US)

(72) Inventor: Hansang Oh, Seongnam Si (KR)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 18/868,498

(22) PCT Filed: Dec. 13, 2022

(86) PCT No.: PCT/US2022/052672

§ 371 (c)(1),
(2) Date: Nov. 22, 2024

(87) PCT Pub. No.: WO2023/229641

PCT Pub. Date: Nov. 30, 2023

(65) Prior Publication Data

US 2026/0023343 A1 Jan. 22, 2026

(30) Foreign Application Priority Data

May 26, 2022 (KR) ........................ 10-2022-0064731

(51) Int. Cl.
*G03G 15/00* (2006.01)
*G03G 15/20* (2006.01)

(52) U.S. Cl.
CPC ......... *G03G 15/70* (2013.01); *G03G 15/2017* (2013.01); *G03G 15/2053* (2013.01); *G03G 15/2064* (2013.01)

(58) Field of Classification Search
CPC ........... G03G 15/2064; G03G 15/2053; G03G 15/2017; G03G 15/70
See application file for complete search history.

(56) References Cited

U.S. PATENT DOCUMENTS

| | | | | |
|---|---|---|---|---|
| 5,406,354 | A * | 4/1995 | Taki | G03G 15/706 399/22 |
| 6,794,669 | B2 | 9/2004 | Chelvayohan et al. | |
| 8,165,716 | B1 * | 4/2012 | Goeking | A47K 10/34 700/231 |
| 2005/0275162 | A1 * | 12/2005 | Sano | B65H 7/125 271/291 |
| 2006/0029411 | A1 * | 2/2006 | Ishii | G03G 15/2042 399/334 |

(Continued)

FOREIGN PATENT DOCUMENTS

| | | | |
|---|---|---|---|
| JP | 04-315105 | A | 11/1992 |
| JP | 08-049042 | A | 2/1996 |

OTHER PUBLICATIONS

"Measurement Sensors: Specular vs Diffuse", Panasonic Industry, https://na.industrial.panasonic.com/blog/measurement-sensors-specular-vs-diffuse, Dec. 7, 2011, 6 pages.

*Primary Examiner* — David H Banh
(74) *Attorney, Agent, or Firm* — Foley & Lardner LLP

(57) ABSTRACT

A fuser includes a fusing member, a pressing member facing the fusing member to form a fusing nip, and a wrap jam detection sensor comprising a light emitting portion to irradiate light to the fusing member and a light receiving portion to receive light diffusely reflected from the fusing member.

15 Claims, 7 Drawing Sheets

(56) References Cited

U.S. PATENT DOCUMENTS

| | | | | |
|---|---|---|---|---|
| 2008/0181644 | A1 * | 7/2008 | Wagatsuma | G03G 15/2028 399/69 |
| 2010/0303521 | A1 * | 12/2010 | Ogawa | G03G 15/2007 399/323 |
| 2013/0251411 | A1 * | 9/2013 | Miura | G03G 15/0189 399/223 |
| 2017/0199489 | A1 * | 7/2017 | Shimomura | G03G 15/70 |
| 2021/0237492 | A1 * | 8/2021 | Watari | B65H 7/04 |

* cited by examiner

WRAP JAM DETECTION FOR FUSER

BACKGROUND

Printers using an electrophotographic method supply toner to an electrostatic latent image formed on an image receptor to form a visible toner image on the image receptor, transfer the visible toner image to a print medium, and then fuse the transferred visible toner image on the print medium.

A fusing process is accompanied by a process of applying heat and pressure to the toner. A fuser may include a fusing member and a pressing member that face each other to form a fusing nip. The fusing member is heated by a heater. The print medium to which the toner image is transferred receives heat and pressure while passing through the fusing nip, and the toner image is fused onto the print medium. During the fusing process, a wrap jam may occur in which the print medium is wrapped around the fusing member of high temperature.

DETAILED DESCRIPTION

Figure 1:
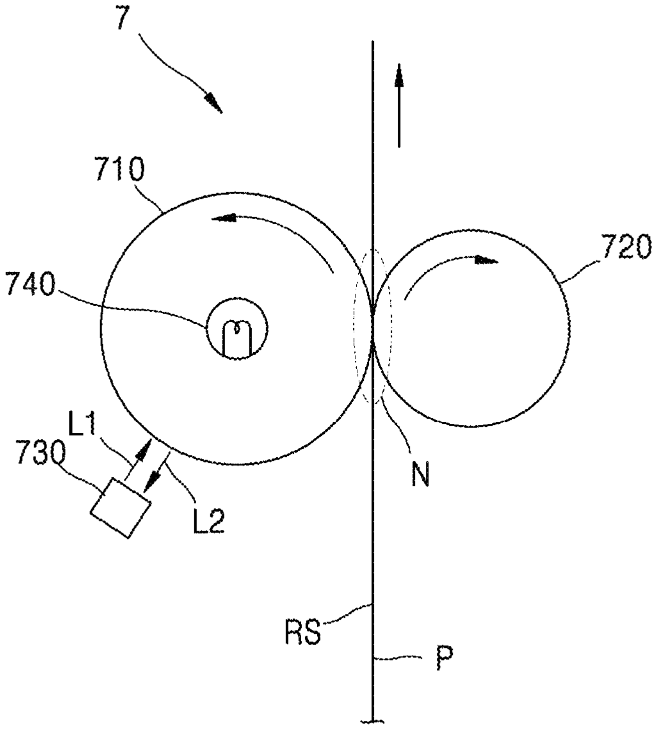
FIG. 1 is a schematic configuration diagram of an example of a fuser.

An electrophotographic image forming apparatus may include an image forming portion that forms a visible toner image on a print medium, for example, paper, and a fuser that applies heat and pressure to the toner image transferred to the print medium to fuse a toner image on the print medium. The fuser may include a fusing member of high temperature and a pressing member facing the fusing member to form a fusing nip. The print medium on which the toner image is formed on an image surface passes through the fusing nip so that the image surface faces a fusing roller. The toner image is fused to the print medium by heat and pressure in the fusing nip.

Jams may occur during a fusing process. In a case where the image surface of the print medium is not separated from a surface of the fusing member, the print medium is wrapped around the surface of the fusing member. This type of jam is called wrap jam. A method of measuring a surface temperature of the fusing member may be considered in order to detect the wrap jam. The fusing member is heated by a heater. A temperature sensor measures the temperature of the fusing member after an operation of the heater is started. A controller controls the heater so that the temperature of the fusing member reaches a fusing temperature and is maintained at the fusing temperature. In a case where the wrap jam occurs, because the print medium is interposed between the fusing member and the temperature sensor, an inclination of a temperature rise of the fusing member is small. In a case where the inclination of the temperature rise is smaller than a certain reference value, the controller may determine that the wrap jam has occurred.

According to a method of detecting the wrap jam using the temperature, because it takes time to detect the wrap jam, it is possible to detect the wrap jam even after the print medium is completely wrapped around the fusing member. Therefore, it is very difficult to remove a jammed print medium from the fusing member after the wrap jam is detected, and there may be a case where a user may not directly remove the jammed print medium. In addition, in a case where the temperature rise of the fusing member is delayed due to the deterioration of the heater performance, there is a possibility of being mistaken for the wrap jam.

According to the fuser of the present example, the wrap jam is detected by an optical method. The fuser of the present example may include a fusing member, a pressing member facing the fusing member to form a fusing nip, and a wrap jam detection sensor receiving diffusely reflected light from the fusing member. The wrap jam detection sensor irradiates light to the fusing member and receives the diffusely reflected light. The wrap jam detection sensor includes a light emitting portion and a light receiving portion. The wrap jam detection sensor may be arranged such that specularly reflected light from the fusing member is not incident on the light receiving portion but the diffusely reflected light is incident on the light receiving portion. The wrap jam detection sensor may have a structure in which the specularly reflected light from the fusing member is not incident on the light receiving portion but the diffusely reflected light is incident on the light receiving portion. The fusing member has a very smooth surface. In a case where the wrap jam does not occur, the light irradiated from the light emitting portion to the outer perimeter of the fusing member is specularly reflected. The specularly reflected light is not incident on the light receiving portion. In a case where the wrap jam occurs, the light emitted from the light emitting portion is reflected from the print medium. The print medium has a relatively rough surface. In addition, the print medium may be wrinkled in a process where the wrap jam occurs. The light incident on the print medium is diffusely reflected. The diffusely reflected light is incident on the light receiving portion. Accordingly, the wrap jam may be detected according to whether the light receiving portion detects the light.

As an example, an optical axis of the light emitting portion and an optical axis of the light receiving portion may overlap each other in a plane orthogonal to an axis of the fusing member to form an integrated optical axis. In this case, a distance between the wrap jam detection sensor and the fusing member and an angle between a normal at an intersection point of the integrated optical axis and the outer perimeter of the fusing member and the integrated optical axis may be determined so that light having the maximum orientation angle among the light emitted from the light emitting portion is not incident on the light receiving portion.

As an example, the light emitting portion and the light receiving portion may have a first optical axis and a second optical axis, respectively. The light emitting portion and the light receiving portion may be arranged to be inclined in the same direction in a plane including the axis of the fusing member and the first and second optical axes. The light emitting portion may be arranged to be inclined toward the light receiving portion. In this regard, an inclination of the light emitting portion may be greater than an inclination of the light receiving portion. The distance between the light emitting portion and the light receiving portion may be determined so that the light having the maximum orientation angle among the light emitted from the light emitting portion is not incident on the light receiving portion, in consideration of the inclination of the optical axis of the light emitting portion and a separation distance between the wrap jam detection sensor and the fusing member. As an example, the light receiving portion may be arranged to be inclined toward the light emitting portion. The specularly reflected light of the light emitted from the light emitting portion may not be incident on the light receiving portion, by making the inclination of the light emitting portion greater than the maximum orientation angle of the light emitting portion. The inclination of the light emitting portion may be smaller than the inclination of the light receiving portion.

The image forming apparatus includes an image forming portion forming a toner image on a print medium, a fuser including the above-described wrap jam detection sensor, and a controller determining whether a jam occurs according to whether the wrap jam detection sensor receives diffusely reflected light. Hereinafter, examples of a fuser and an image forming apparatus employing the same will be described with reference to the drawings. Components having the same function are denoted by the same reference numerals, and redundant descriptions thereof are omitted.

FIG. 1 is a schematic configuration diagram of an example of a fuser 7. Referring to FIG. 1, the fuser 7 may include a fusing member 710, a pressing member 720, and a wrap jam detection sensor 730. The fusing member 710 is heated by a heater 740. The pressing member 720 faces the fusing member 710 to form a fusing nip N. The wrap jam detection sensor 730 irradiates a light L1 to the outer perimeter of the fusing member 710 and receives a diffusely reflected light L2 from among the reflected light.

The fusing member 710 may be, for example, a fusing roller. The fusing roller may include a hollow metal core. A release layer for improving separability may be provided on the outer perimeter of the metal core. The release layer may include, for example, one or two or more of perfluoroalkoxy (PFA), polytetrafluoroethylenes (PTFE), fluorinated ethylene prophylene (FEP), etc. The heater 740 is arranged inside the hollow metal core. The pressing member 720 may be a pressing roller facing the fusing roller. The pressing roller may include a heat-resistant elastic layer. The fusing roller and the pressing roller are pressed against each other by a pressing member (not shown) to form the fusing nip N. A print medium P is transferred to the fusing nip N so that an image surface RS faces the fusing member 710, and in a case where the fusing roller and the pressing roller are rotated, the print medium P inside the fusing nip N may be transported.

The fusing member 710 may be, for example, a fusing belt. The fusing belt may include a flexible base layer (not shown). The base layer may include a thin metal film such as stainless steel, nickel, nickel copper, etc. The base layer may include a polymer film having heat resistance and abrasion resistance capable of withstanding a fusing temperature such as a polyimide film, a polyamide film, a polyimideamide film, etc. A release layer (not shown) may be provided on a surface or both surfaces of the pressing member 720 of the base layer. The release layer may be a resin layer having excellent separability. The release layer may include, for example, one or two or more of perfluoroalkoxy (PFA), polytetrafluoroethylenes (PTFE), fluorinated ethylene prophylene (FEP), etc. In order to form the relatively wide and flat fusing nip N, an elastic layer (not shown) may be interposed between the base layer and the release layer. The elastic layer may include a material having heat resistance capable of withstanding the fusing temperature. For example, the elastic layer may include a rubber material such as fluororubber or silicone rubber. The pressing member 720 may be a pressing roller facing the fusing belt. The pressing roller may include a heat-resistant elastic layer. A heater may be arranged inside the fusing belt. A support member may be arranged inside the fusing belt. The support member and the pressing roller are pressed against each other with the fusing belt interposed therebetween to form the fusing nip N. The print medium P is transferred into the fusing nip N so that the image surface RS faces the fusing belt, and in a case where the pressing roller rotates, the fusing belt circulates, and the print medium P inside the fusing nip N may be transported.

The heater 740 is positioned inside the fusing member 710 to heat the fusing member 710. As the heater 740, a halogen lamp arranged inside the fusing roller or the fusing belt, a ceramic heater that comes into contact with the inner perimeter of the fusing belt to directly heat the fusing belt, etc. may be employed.

Figure 2:
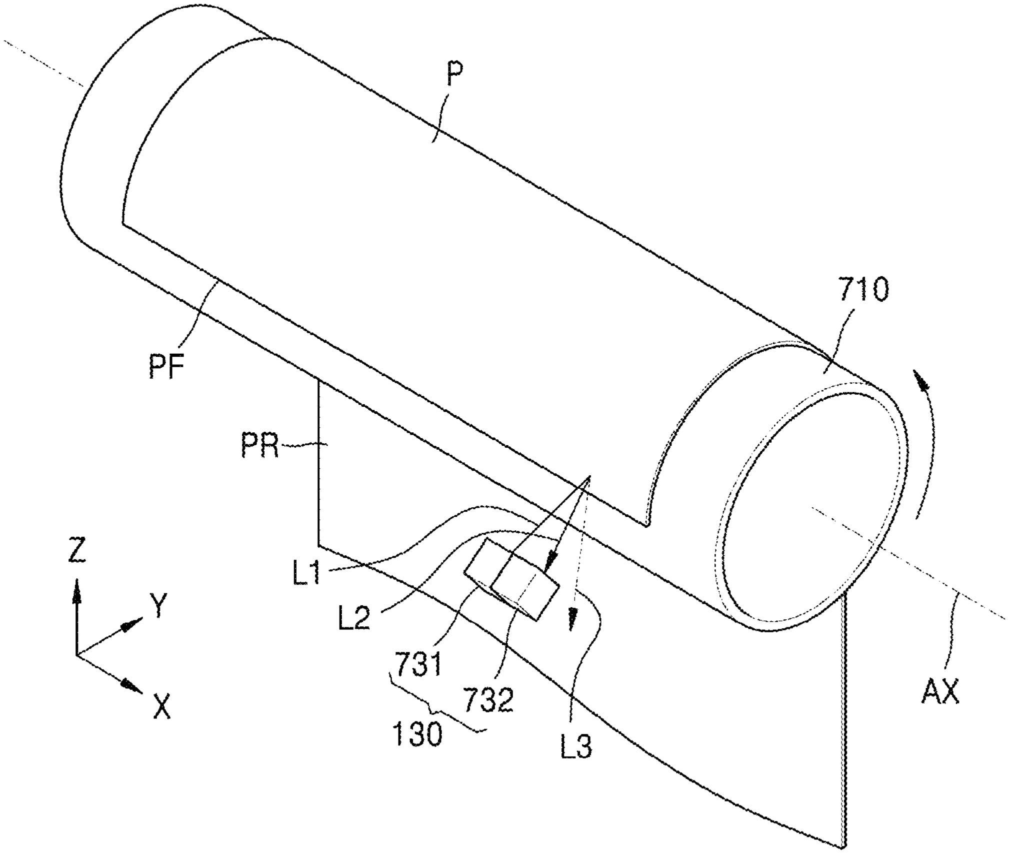
FIG. 2 is a schematic perspective view of an example of the fuser shown in FIG. 1.

FIG. 2 is a schematic perspective view of an example of the fuser 7 shown in FIG. 1. In FIG. 2, the pressing member 720 is omitted. Referring to FIG. 2, the wrap jam detection sensor 730 may include a light emitting portion 731 that irradiates the light L1 to the outer perimeter of the fusing member 710, and a light receiving portion 732 that receives the diffusely reflected light L2 from the outer perimeter of the fusing member 710. The light receiving portion 732 does not receive a specularly reflected light L3. The wrap jam detection sensor 730 may have an arrangement in which the specularly reflected light L3 is not incident on the light receiving portion 732. The wrap jam detection sensor 730 may have a structure in which the specularly reflected light L3 is not incident on the light receiving portion 732.

In a case where a wrap jam does not occur, the light L1 emitted from the light emitting portion 731 is reflected from the outer perimeter of the fusing member 710. The fusing member 710, for example, a fusing roller and a fusing belt, has a very smooth surface. Accordingly, the light reflected from the outer perimeter of the fusing member 710 is almost the specularly reflected light L3. The specularly reflected light L3 is not incident on the light receiving portion 732. In a case where the wrap jam occurs, the print medium P is partially wrapped around the outer perimeter of the fusing member 710. The light L1 emitted from the light emitting portion 731 is incident on the print medium P partially wrapped around the outer perimeter of the fusing member 710. The print medium P has a relatively rough surface. In addition, the print medium P may be wrinkled in a process where the wrap jam occurs. The light L1 is diffusely reflected from the print medium P. The diffusely reflected light L2 is incident on the light receiving portion 732. Accordingly, in a case where light is detected by the light receiving portion 732, it may be determined that the wrap jam has occurred.

According to the wrap jam detection structure using a temperature sensor of the related art, because it takes time to measure an inclination of a temperature rise of the fusing member 710, the wrap jam may be detected even after the print medium P is completely wrapped around the fusing member 710. Therefore, it may be very difficult to remove the jammed print medium P. In some cases, it may be impossible to remove the jammed print medium P, and a fuser itself may have to be replaced.

According to the fuser 7 of the present example, in a case where a front end PF of the print medium P that has started to be wrapped around the fusing member 710 due to the wrap jam reaches a detection position of the wrap jam detection sensor 730, the wrap jam may be detected immediately. That is, the wrap jam may be detected before the print medium P is completely wrapped around the fusing member 710 one turn. The controller (processor) (FIG. 7:9), which will be described below, may stop an operation of the fuser 7 in a case where the wrap jam is detected. Because before the print medium P is wrapped around the fusing member 710 one turn, a user may easily remove the jammed print medium P by holding an unwrapped part PR of the print medium P.

The wrap jam detection sensor 730 may be arranged to face the outer perimeter of the fusing member 710 between an outlet of the fusing nip N and an inlet of the fusing nip N. For example, the wrap jam detection sensor 730 may be arranged adjacent to an exit of the fusing nip N. In this case, it may be detected whether the wrap jam has occurred at an initial stage in a case where the wrap jam has occurred.

Referring back to FIG. 1, the wrap jam detection sensor 730 may be disposed below the heater 740. Heat of the heater 740 may affect the wrap jam detection sensor 730. In a case where the temperature of the wrap jam detection sensor 730 is excessively high, the light emitting characteristics of the light emitting portion 731 and the light receiving characteristics of the light receiving portion 732 may be deteriorated. The heat of the heater 740 is mainly transferred to the wrap jam detection sensor 730 by convection. A heat effect of the heater 740 on the wrap jam detection sensor 730 by convection may be reduced, by disposing the wrap jam detection sensor 730 below the heater 740.

The wrap jam detection sensor 730 may have various arrangements and structures such that the specularly reflected light L3 is not incident on the light receiving portion 732 but the diffusely reflected light L2 is incident on the light receiving portion 732.

Figure 3:
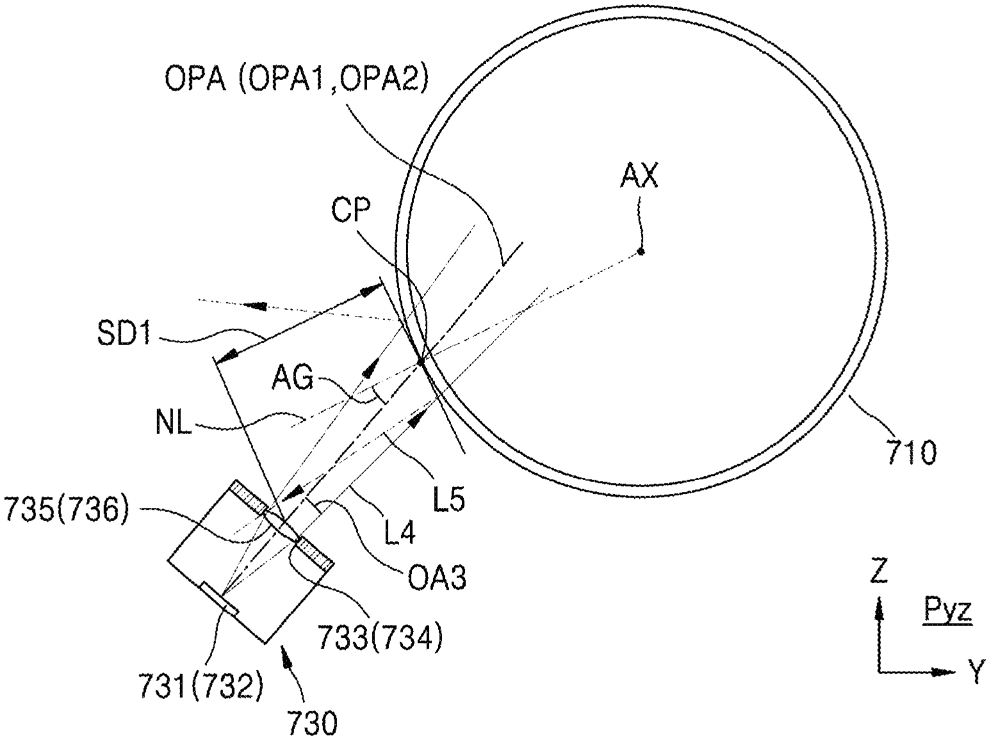
FIG. 3 is a cross-sectional view of an example of an arrangement of a wrap jam detection sensor taken along a plane perpendicular to an axis of a fusing member.

FIG. 3 is a cross-sectional view of an example of an arrangement of the wrap jam detection sensor 730 taken along a plane Pyz perpendicular to an axis AX of the fusing member 710. Referring to FIG. 3, for example, the axis AX is parallel to an X axis of FIG. 2, and the plane Pyz is parallel to an YZ plane of FIG. 2. The wrap jam detection sensor 730 is illustrated as being projected on the plane Pyz perpendicular to the axis AX of the fusing member 710. The light emitting portion 731 and the light receiving portion 732 may be arranged in parallel with the axis AX of the fusing member 710. Accordingly, in FIG. 3, the light emitting portion 731 and the light receiving portion 732 are illustrated as overlapping each other. An opening 733 of the light emitting portion 731 and an opening 734 of the light receiving portion 732 are illustrated as overlapping each other. Lenses 735 and 736 may be respectively arranged in the opening 733 of the light emitting portion 731 and the opening 734 of the light receiving portion 732.

In the plane Pyz perpendicular to the axis AX of the fusing member 710, a first optical axis OPA1 of the light emitting portion 731 and a second optical axis OPA2 of the light receiving portion 732 may overlap each other to form an integrated optical axis OPA. The wrap jam detection sensor 730 is arranged to be spaced apart from the fusing member 710 by a certain distance. The wrap jam detection sensor 730 is arranged to be inclined at a certain angle with respect to a normal NL at an intersection point CP between the integrated optical axis OPA and the outer perimeter of the fusing member 710. In this case, an angle between the normal line NL and the integrated optical axis OPA is referred to as AG, and a distance between the intersection point CP and the wrap jam detection sensor 730 is referred to as SD1. At this time, the angle AG and the distance SD1 may be determined such that a specularly reflected light L5 of a light L4 having a maximum orientation angle OA3 among the light emitted from the light emitting portion 731 is not incident on the light receiving portion 732.

For example, the state shown in FIG. 3 is a boundary state in which the specularly reflected light L5 of the light L4 having the maximum orientation angle OA3 among the light emitted from the light emitting portion 731 is not incident on the light receiving portion 732. Accordingly, the specularly reflected light L5 may not be incident on the light receiving portion 732, by decreasing the distance SD1 while maintaining the angle AG or by increasing the angle AG while maintaining the distance SD1. The angle AG and the distance SD1 may be appropriately selected in consideration of the arrangement of other parts of the fuser 7 and the space in the image forming apparatus which will be described below. According to such a configuration, in a case where the wrap jam does not occur, a specularly reflected light reflected from the outer perimeter of the fusing member 710 is not incident on the light receiving portion 732. In a case where the wrap jam occurs, the light irradiated from the light emitting portion 731 is incident on the print medium P partially wrapped around the outer perimeter of the fusing member 710. Light reflected from the print medium P is diffusely reflected in various directions, and part of the diffusely reflected light may be incident on the light receiving portion 732.

Figure 4:
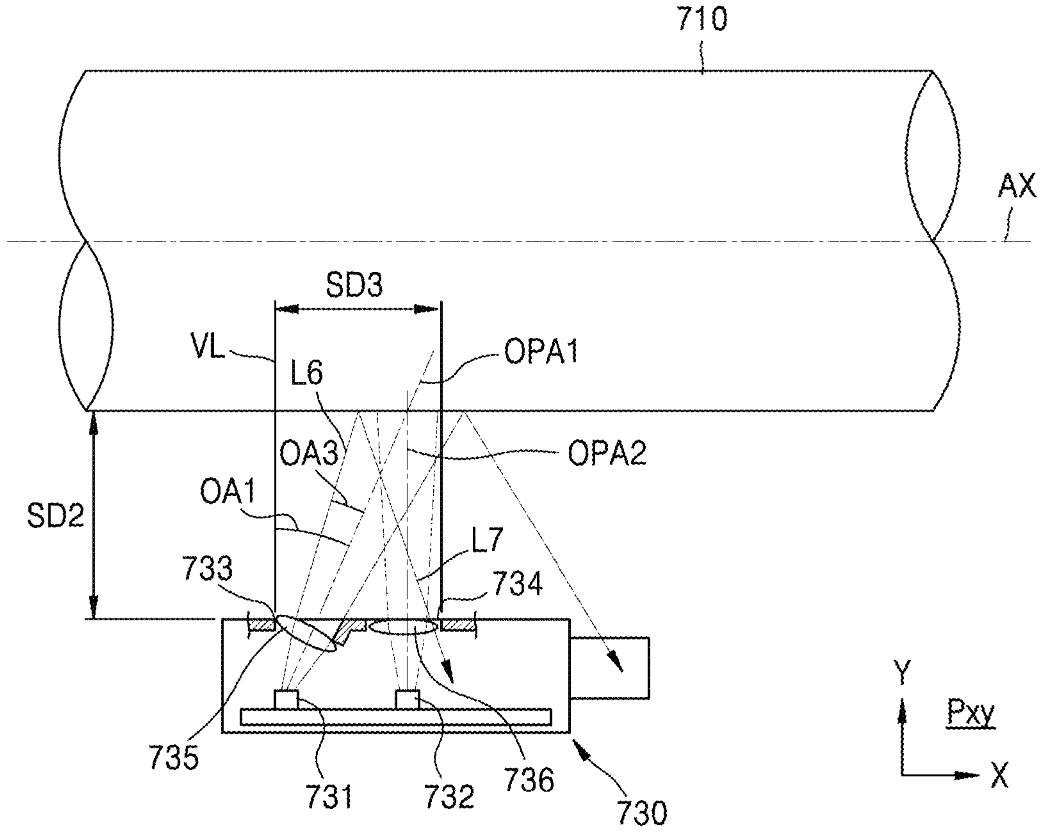
FIG. 4 is a cross-sectional view of an example of the wrap jam detection sensor taken along a plane including the axis of the fusing member.
Figure 5:
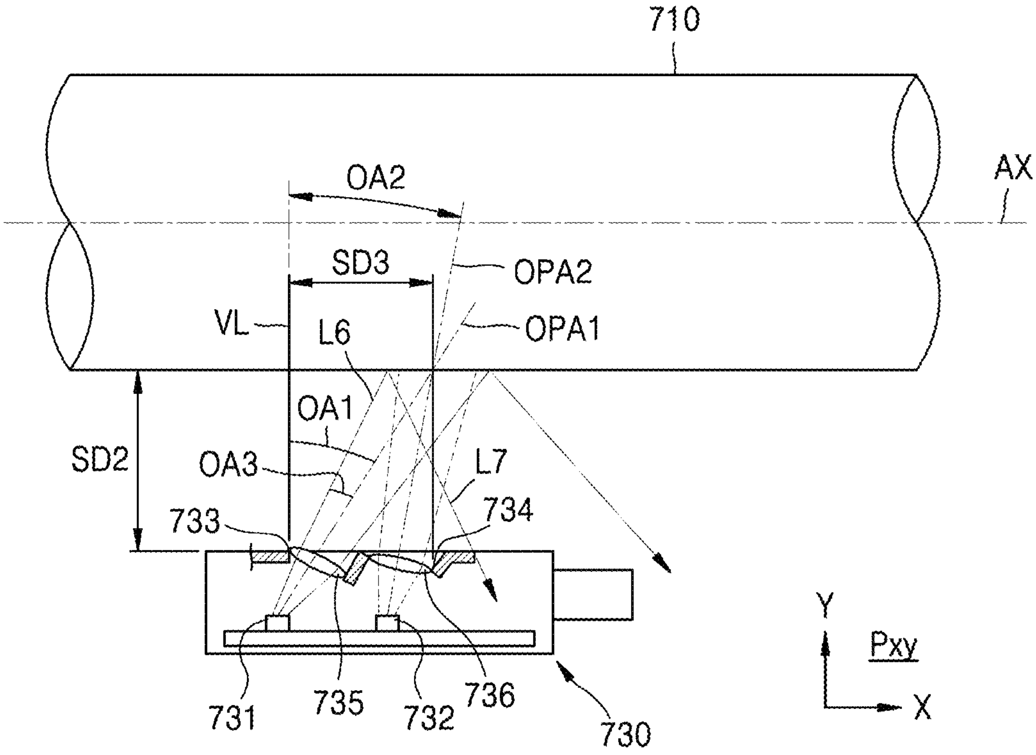
FIG. 5 is a cross-sectional view of an example of the wrap jam detection sensor taken along the plane including the axis of the fusing member.

The wrap jam detection sensor 730 may have a structure in which the specularly reflected light is not incident on the light receiving portion 732. Such a structure may be implemented by adjusting factors such as the inclination of the optical axis of the light emitting portion 731, the inclination of the optical axis of the light receiving portion 732, the space between the light emitting portion 731 and the light receiving portion 732, the distance between the wrap jam detection sensor 730 and the fusing member 710, etc. FIGS. 4 and 5 are cross-sectional views of an example of the wrap jam detection sensor 730 taken along a plane Pxy including the axis AX of the fusing member 710. In FIGS. 4 and 5, the plane Pxy is a plane including the axis AX of the fusing member 710 and optical axes of the light emitting portion 731 and the light receiving portion 732. For example, the axis AX is parallel to an X axis of FIG. 2, and the plane Pxy is parallel to an XY plane of FIG. 2. The light emitting portion 731 and the light receiving portion 732 are arranged in parallel with the axis AX of the fusing member 710. In a case where the wrap jam detection sensor 730 is arranged to have a certain angle with respect to the Y-axis, that is, in a case where the optical axes of the light emitting portion 731 and the light receiving portion 732 are arranged to have a certain angle with respect to the Y axis, the plane Pxy may be a plane rotated by a certain angle with respect to the X-axis.

In the plane Pxy, the first optical axis OPA1 of the light emitting portion 731 has a first angle OA1 with respect to a line VL orthogonal to the axis AX. The second optical axis OPA2 of the light receiving portion 732 has a second angle OA2 with respect to the line VL orthogonal to the axis AX. In the example shown in FIG. 4, the second angle OA2 is 0 degree. In other words, the second optical axis OPA2 is orthogonal to the axis AX. With respect to an extension direction of the first optical axis OPA1, the light receiving portion 732 is located on a downstream side in a direction of the axis AX with respect to the light emitting portion 731. The light emitting portion 731 is inclined toward the light receiving portion 732. In other words, the wrap jam detection sensor 730 has a structure in which the first optical axis OPA1 is inclined toward the second optical axis OPA2. In such an arrangement, a separation distance SD2 between the outer perimeter of the fusing member 710 and the wrap jam detection sensor 730 in the plane Pxy including the axis AX, the first angle OA1, and a maximum distance SD3 between the light emitting portion 731 and the light receiving portion 732 may be determined so that a specularly reflected light L7 of a light L6 having the maximum orientation angle OA3 among the light emitted from the light emitting portion 731 is not incident on the light receiving portion 732.

For example, in FIGS. 4 and 5, the light having the maximum orientation angle OA3 among the light emitted from the light emitting portion 731 is the light L6 farthest from the light receiving portion 732. The distance SD3 is the maximum separation distance between the opening 733 of the light emitting portion 731 and the opening 734 of the light receiving portion 732. A condition for preventing the specularly reflected light L7 of the light L6 from being incident on the opening 734 of the light receiving portion 732 is as shown in Equation (1) below.

$$SD3 < 2 \times SD2 \times \tan(OA1 - OA3) \quad \text{Equation (1)}$$

In a case where Equation (1) is satisfied, the specularly reflected light L7 of the light L6 is not incident on the light receiving portion 732. In a case where a wrap jam does not occur, a specularly reflected light reflected from the outer perimeter of the fusing member 710 is not incident on the light receiving portion 732. In a case where the wrap jam occurs, the light irradiated from the light emitting portion 731 is incident on the print medium P partially wrapped around the outer perimeter of the fusing member 710. Light reflected from the print medium P is diffusely reflected in various directions, and part of the diffusely reflected light may be incident on the light receiving portion 732. Accordingly, it may be detected whether the wrap jam is present according to whether the diffusely reflected light is incident on the light receiving portion 732.

In FIGS. 4 and 5, the first angle OA1 is greater than the second angle OA2. In other words, the inclination of the first optical axis OPA1 is greater than the inclination of the second optical axis OPA2. In FIG. 4, the second angle OA2 is 0 degree, and the first angle OA1 is greater than 0 degree. In FIG. 5, the first optical axis OPA1 and the second optical axis OPA2 are inclined in the same direction, and the first angle OA1 is greater than the second angle OA2. According to such a configuration, the separation distance SD3 satisfying the condition that the specularly reflected light L7 of the light L6 having the maximum orientation angle OA3 is not incident on the light receiving portion 732 may be reduced. Accordingly, the length of the wrap jam detection sensor 730 in the direction of the axis AX may be reduced. In addition, the diffusely reflected light may be easily incident on the light receiving portion 732, by reducing the second angle OA2 of the second optical axis OPA2 of the light receiving portion 732.

Figure 6:
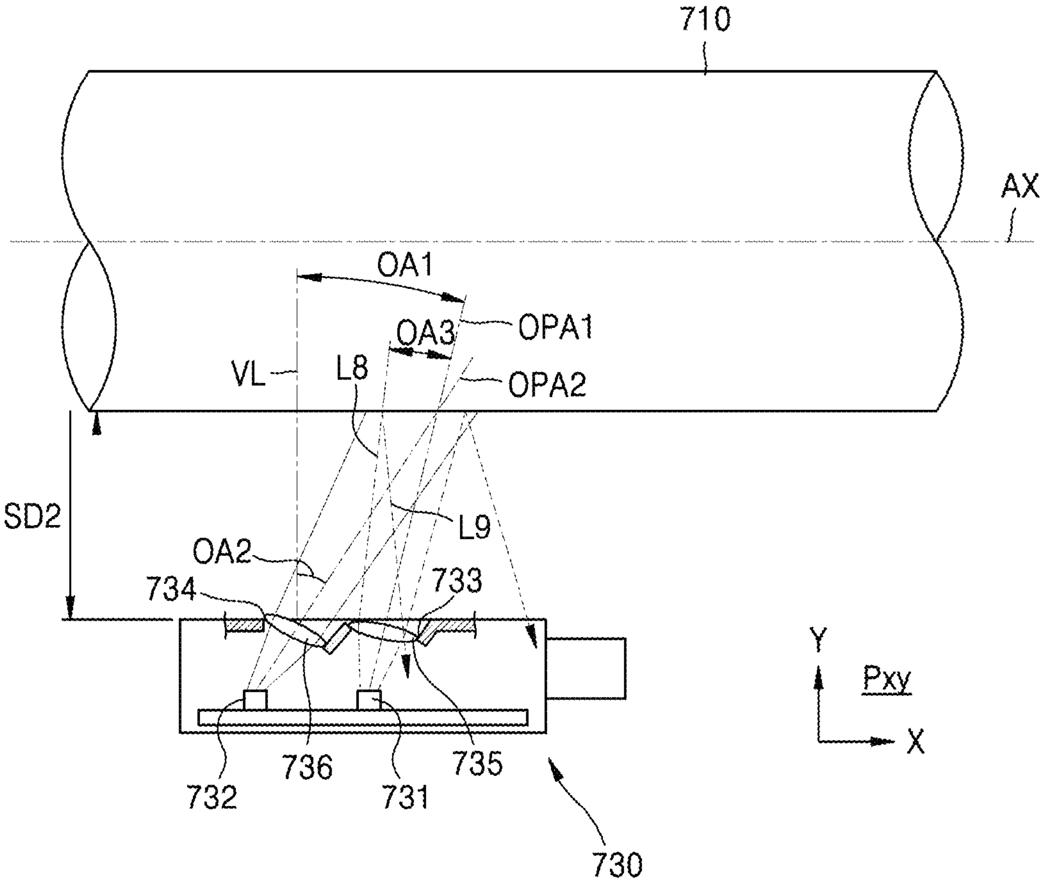
FIG. 6 is a cross-sectional view of an example of the wrap jam detection sensor taken along the plane including the axis of the fusing member.

FIG. 6 is a cross-sectional view of an example of the wrap jam detection sensor 730 taken along the plane Pxy including the axis AX of the fusing member 710. In FIG. 6, the plane Pxy includes the axis AX of the fusing member 710 and optical axes of the light emitting portion 731 and the light receiving portion 732. For example, the axis AX is parallel to an X axis of FIG. 2, and the plane Pxy is parallel to an XY plane of FIG. 2. The light emitting portion 731 and the light receiving portion 732 are arranged in parallel with the axis AX of the fusing member 710. In a case where the wrap jam detection sensor 730 is arranged to have a certain angle with respect to the Y-axis, that is, in a case where the optical axes of the light emitting portion 731 and the light receiving portion 732 are arranged to have a certain angle with respect to the Y axis, the plane Pxy may be a plane rotated by a certain angle with respect to the X-axis.

In the plane Pxy, the light emitting portion 731 and the light receiving portion 732 are arranged so that the first optical axis OPA1 and the second optical axis OPA2 are inclined in the same direction. With respect to an extension direction of the first optical axis OPA1, the light receiving portion 732 is positioned on an upstream side in a direction of the axis AX with respect to the light emitting portion 731. The light receiving portion 732 is inclined toward the light emitting portion 731. In other words, the wrap jam detection sensor 730 has a structure in which the second optical axis OPA2 is inclined toward the first optical axis OPA1. The first optical axis OPA1 of the light emitting portion 731 has the first angle OA1 with respect to the line VL orthogonal to the axis AX. The second optical axis OPA2 of the light receiving portion 732 has the second angle OA2 with respect to the line VL orthogonal to the axis AX. In such an arrangement, the first angle OA1 and the maximum orientation angle OA3 may be determined so that a specularly reflected light L9 of a light L8 having the maximum orientation angle OA3 among the light emitted from the light emitting portion 731 is not incident on the light receiving portion 732. The light L8 having the maximum beam angle OA3 is a light closest to the light receiving portion 732. For example, the first angle OA1 and the maximum orientation angle OA3 may have a relationship of Equation (2) below.

$$OA1 > OA3 \quad \text{Equation (2)}$$

In a case where Equation (2) is satisfied, the specularly reflected light L9 of the light L8 is reflected from the outer perimeter of the fusing member 710 to an opposite side of the light receiving portion 732. Accordingly, the specularly reflected light L9 is not incident on the light receiving portion 732. In a case where a wrap jam does not occur, a specularly reflected light reflected from the outer perimeter of the fusing member 710 is not incident on the light receiving portion 732. In a case where the wrap jam occurs, the light irradiated from the light emitting portion 731 is incident on the print medium P partially wrapped around the outer perimeter of the fusing member 710. Light reflected from the print medium P is diffusely reflected in various directions, and part of the diffusely reflected light may be incident on the light receiving portion 732. Accordingly, it may be detected whether the wrap jam is present according to whether the diffusely reflected light is incident on the light receiving portion 732.

The examples shown in FIGS. 4 to 6 are examples of a case where an angle between the optical axis of the light emitting portion 731 and the Y axis is the same as an angle between the optical axis of the light receiving portion 732 and the Y axis. However, the scope of the disclosure is not limited thereto. An angle between the first optical axis OA1 of the light emitting portion 731 and the Y axis and an angle between the second optical axis OA2 of the light receiving portion 732 and the Y axis may be different from each other. In this case, the plane Pxy may include the axis AX of the fusing member 710, and an angle between the plane Pxy and the Y axis may be an average of the angle between the first optical axis OA1 of the light emitting portion 731 and the Y axis and the angle between the second optical axis OA2 of the light receiving portion 732 and the Y axis. The first angle OA1, the second angle OA2, the maximum orientation angle OA3, the distance SD2, and the distance SD3 may be values in a state where the wrap jam detection sensor 710 is projected onto the plane Pxy.

As described above, according to the fuser 7 employing the wrap jam detection sensor 730 having a structure or arrangement receiving a diffusely reflected light without receiving a specular reflected light, the wrap jam may be detected before the jammed print medium P is wrapped around the fusing member 710 one turn. Therefore, the jammed print medium P is easily removed. In addition, the risk of damage to the fuser 7 due to the wrap jam may be reduced, and a service call for removing the wrap jam may be reduced, and thus the post-management cost of a user and a manufacturer may be reduced.

Figure 7:
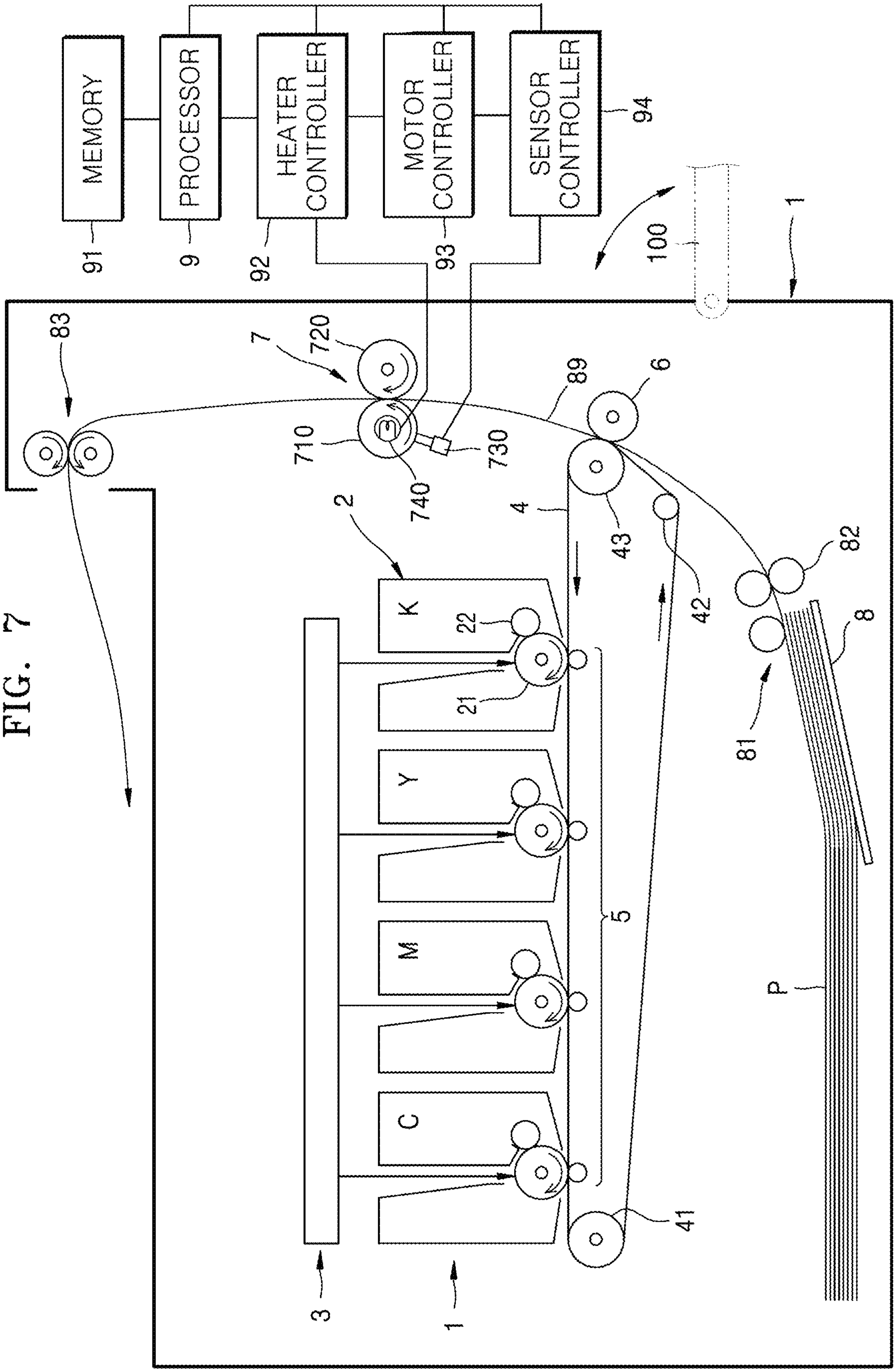
FIG. 7 is a schematic configuration diagram of an example of an image forming apparatus.

FIG. 7 is a schematic diagram of an example of an image forming apparatus. Referring to FIG. 7, the example of the image forming apparatus may include an image forming portion 1 that forms a toner image on the print medium P. and the fuser 7 that fuses the toner image on the print medium P. The image forming portion 1 may include a developing device 2, an optical scanner 3, and a transfer unit. The fuser 7 is the same as described with reference to FIGS. 1 to 6. A processor 9 determines whether a jam is present according to whether the wrap jam detection sensor 730 receives a diffusely reflected light.

For color printing, the developing device 2 may include four developing devices 2C, 2M, 2Y, and 2K for respectively forming toner images of cyan (C: cyan), magenta (M: magenta), yellow (Y: yellow) and black (K: black) colors. Hereinafter, unless otherwise specified, reference numerals with C. M. Y. and K respectively refer to components for developing developers of the cyan (C: cyan), magenta (M: magenta), yellow (Y: yellow), and black (K: black)) colors. The optical scanner 3 respectively irradiate light modulated in correspondence to image information of the cyan (C), magenta (M), yellow (Y), and black (K) colors to photosensitive drums 21 of the developing devices 2C, 2M, 2Y, and 2K and forms electrostatic latent images respectively corresponding to the cyan (C), magenta (M), yellow (Y), and black (K) colors on the photosensitive drums 21. An example of the optical scanner 3 may be a laser scanning unit (LSU) using a laser diode as a light source.

The transfer unit transfers a toner image formed on the photosensitive drum 21 to the print medium P. In the present example, an intermediate transfer type transfer unit is employed. As an example, the transfer unit may include an intermediate transfer belt 4, intermediate transfer rollers 5, and a transfer roller 6. The intermediate transfer belt 4 intermittently accommodates the toner images developed on the four photosensitive drums 21. The intermediate transfer belt 4 is supported by support rollers 41, 42 and 43 and circulates. Four intermediate transfer rollers 5 are arranged at positions facing the four photosensitive drums 21 with the intermediate transfer belt 4 interposed therebetween. An intermediate transfer bias voltage for intermediately transferring the toner images developed on the photosensitive drums 21 to the intermediate transfer belt 4 is applied to the intermediate transfer rollers 5. Instead of the intermediate transfer rollers 5, a corona transfer unit or a pin scorotron type transfer unit may be employed. The transfer roller 6 is positioned to face the intermediate transfer belt 4. A transfer bias voltage for transferring the toner images transferred on the intermediate transfer belt 4 to the print medium P is applied to the transfer roller 6. The fuser 7 applies heat and/or pressure to the toner images transferred to the print medium P to fus the toner images on the print medium P.

According to the configuration above, the optical scanner 3 respectively scans the four lights modulated in correspondence to the image information of each color to the four photosensitive drums 21 and respectively forms electrostatic latent images on the four photosensitive drums 21. The electrostatic latent images of the four photosensitive drums 21 are developed as visible C, M, Y, and K toner images by C, M, Y, and K toners respectively accommodated in the four developing devices 20, 2M, 2Y, and 2K. The developed toner images are sequentially intermediately transferred to the intermediate transfer belt 4. The print medium P loaded on a loading table 8 is transported between the transfer roller 6 and the intermediate transfer belt 4 by a pickup roller 81 and a transporting roller 82. The toner images intermediately transferred on the intermediate transfer belt 4 are transferred to the print medium P by the transfer bias voltage applied to the transfer roller 6. In a case where the print medium P passes through the fuser 7, the toner images are fused to the print medium P by heat and pressure. The completely fused print medium P is discharged by a discharge roller 83.

The processor 9 may include, for example, a central processing unit (CPU). A memory 91 may store an application program, a control factor, etc. for controlling the image forming apparatus. The processor 9 may control the wrap jam detection sensor 730 to emit light from the light emitting portion 731 through a sensor controller 94. A detection signal detected by the light receiving portion 732 of the wrap jam detection sensor 730 is input to the processor 9 through a sensor controller 94. The processor 9 compares a reference signal stored in the memory 91 with the detection signal to determine whether a wrap jam occurs. In a case where it is determined that the wrap jam has occurred, the processor 9 stops an operation of the image forming apparatus. For example, the processor 9 stops driving the heater 740 and the fuser 7 through a heater controller 92 and the motor controller 93. The processor 9 may output an error message indicating that the wrap jam has occurred through a user interface that is not shown.

For example, a user opens a door 100 to expose a part of the image forming portion 1, for example, a medium transport path 89. In this case, as shown in FIG. 2, the part PR, which is not wrapped around the fusing member 710, of the print medium P in which the wrap jam has occurred is exposed to the medium transport path 89. The user may easily remove the wrap jammed print medium P from the fuser 700 by pulling the part PR of the print medium P.

It should be understood that examples described herein should be considered in a descriptive sense only and not for purposes of limitation. Descriptions of features or aspects within each example should typically be considered as available for other similar features or aspects in other examples. While one or more examples have been described with reference to the figures, it will be understood by those of ordinary skill in the art that various changes in form and details may be made therein without departing from the spirit and scope as defined by the following claims.

What is claimed is:

1. A fuser comprising:

a fusing member;

a pressing member facing the fusing member to form a fusing nip; and a wrap jam detection sensor comprising a light emitting portion to irradiate light to the fusing member and a light receiving portion to receive light diffusely reflected from the fusing member, wherein the wrap jam detection sensor is arranged such that specularly reflected light from the fusing member is not incident on the light receiving portion but diffusely reflected light is incident on the light receiving portion.

2. The fuser of claim 1, further comprising:

a heater to heat the fusing member, wherein the wrap jam detection sensor is disposed below the heater.

3. The fuser of claim 1, wherein a first optical axis of the light emitting portion and a second optical axis of the light receiving portion overlap each other on a plane perpendicular to an axis of the fusing member to form an integrated optical axis, and an angle between a normal at an intersection point of the integrated optical axis and an outer perimeter of the fusing member and the integrated optical axis, and a distance between the intersection point and the wrap jam detection sensor are selected so that specularly reflected light of light having a maximum orientation angle among the light emitted from the light emitting portion is not incident on the light receiving portion.

4. The fuser of claim 1, wherein a first optical axis of the light emitting portion has a first angle with respect to a reference line orthogonal to an axis of the fusing member, a second optical axis of the light receiving portion has a second angle with respect to the reference line, and in a plane including the axis of the fusing member, the first optical axis, and the second optical axis, a separation distance between an outer perimeter of the fusing member and the jam detection sensor, the first angle, and a maximum distance between the light emitting portion and the light receiving portion, are selected so that specularly reflected light of light having a maximum orientation angle emitted from the light emitting portion is not incident on the light receiving portion.

5. The fuser of claim 4, wherein the light receiving portion is positioned on a downstream side of the light emitting portion with respect to an extension direction of the first optical axis.

6. The fuser of claim 5, wherein the first angle is greater than the second angle.

7. The fuser of claim 5, wherein the fusing member and the wrap jam detection sensor satisfy the equation:

$$SD3 < 2 \times SD2 \times \tan(OA1 - OA3).$$

where the first angle is OA1, a maximum orientation angle of the light emitted from the light emitting portion is OA3, the separation distance is SD2, and a maximum distance between the light emitting portion and the light receiving portion is SD3.

8. The fuser of claim 4, wherein the light receiving portion is positioned on an upstream side of the light emitting portion with respect to an extension direction of the first optical axis.

9. The fuser of claim 8, wherein the first angle is smaller than the second angle, and the fusing member and the wrap jam detection sensor satisfy the equation:

$$OA1 > OA3.$$

where the first angle is OA1 and a maximum orientation angle of the light emitted from the light emitting portion is OA3.

10. An image forming apparatus comprising:

an image forming portion to form a toner image on a print medium;

a fuser to fuse the toner image to the print medium, the fuser comprising:

a fusing member;

a pressing member facing the fusing member to form a fusing nip; and a wrap jam detection sensor comprising a light emitting portion to irradiate light to the fusing member and a light receiving portion to receive light diffusely reflected from the fusing member, wherein the wrap jam detection sensor is arranged such that specularly reflected light from the fusing member is not incident on the light receiving portion but diffusely reflected light is incident on the light receiving portion; and a processor to identify whether a jam is present according to the wrap jam detection sensor.

11. The image forming apparatus of claim 10, further comprising:

a heater to heat the fusing member, wherein the wrap jam detection sensor is disposed below the heater.

12. The image forming apparatus of claim 10, wherein a first optical axis of the light emitting portion and a second optical axis of the light receiving portion overlap each other on a plane perpendicular to an axis of the fusing member to form an integrated optical axis, and an angle between a normal at an intersection point of the integrated optical axis and an outer perimeter of the fusing member and the integrated optical axis, and a distance between the intersection point and the wrap jam detection sensor are selected so that specularly reflected light of light having a maximum orientation angle among the light emitted from the light emitting portion is not incident on the light receiving portion.

13. The image forming apparatus of claim 12, wherein a first optical axis of the light emitting portion has a first angle with respect to a reference line orthogonal to an axis of the fusing member, a second optical axis of the light receiving portion has a second angle with respect to the reference line, and in a plane including the first optical axis, the second optical axis, and the axis of the fusing member, a separation distance between an outer perimeter of the fusing member and the jam detection sensor and the first angle are selected so that specularly reflected light of light having a maximum orientation angle emitted from the light emitting portion is not incident on the light receiving portion.

14. The image forming apparatus of claim 13, wherein the light receiving portion is positioned on a downstream side of the light emitting portion with respect to an extension direction of the first optical axis and the first angle is greater than the second angle, and wherein the fusing member and the wrap jam detection sensor satisfy the equation:

$$SD3 \leq 2 \times SD2 \times \tan(OA1 - OA3).$$

where the first angle is OA1, a maximum orientation angle of the light emitted from the light emitting portion is OA3, the separation distance is SD2, and a maximum distance between the light emitting portion and the light receiving portion is SD3.

15. The image forming apparatus of claim 13, wherein the light receiving portion is positioned on an upstream side of the light emitting portion with respect to an extension direction of the first optical axis and the first angle is smaller than the second angle, and wherein the fusing member and the wrap jam detection sensor satisfy the equation:

$$OA1 > OA3.$$

where the first angle is OA1, and a maximum orientation angle of the light emitted from the light emitting portion is OA3.

* * * * *